March 14, 1944.  J. C. A. STRAUB  2,344,275
BEARING
Filed April 8, 1941
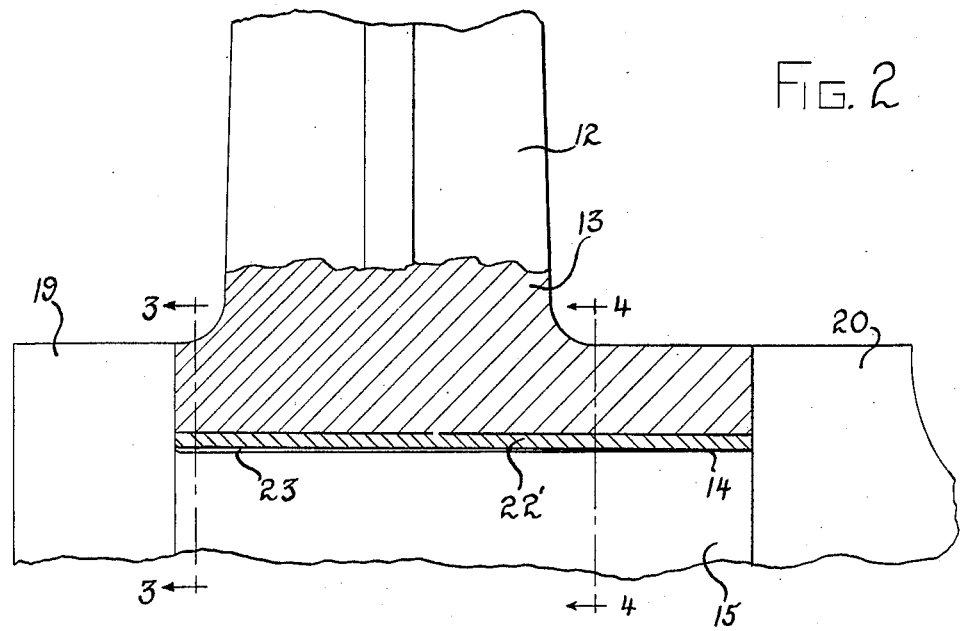
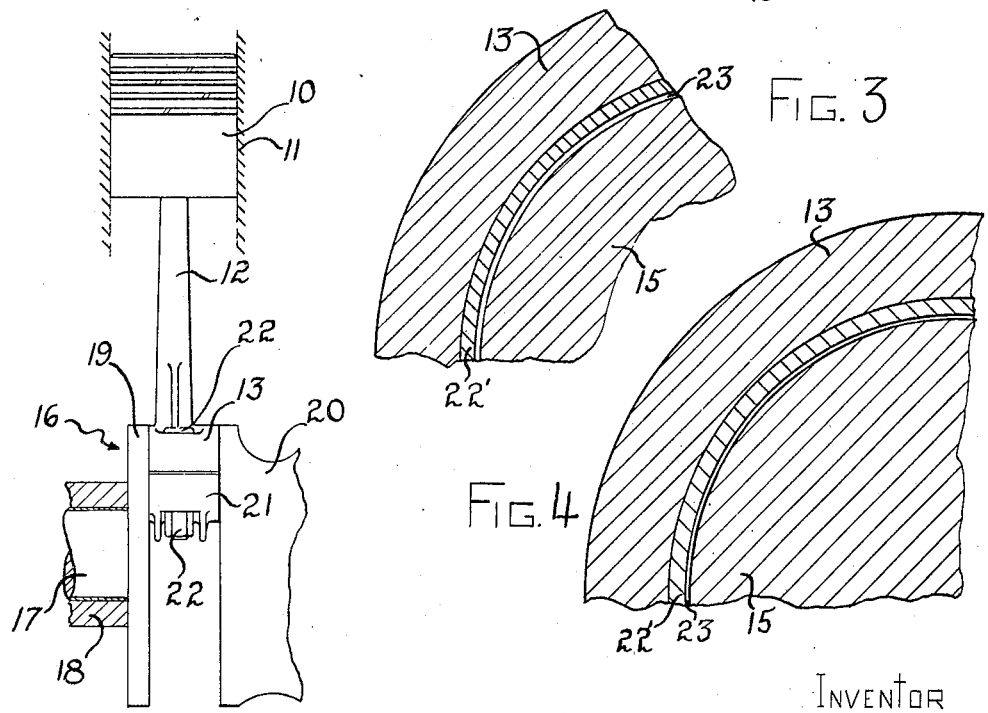
INVENTOR
Joseph C. A. Straub
BY Paul O. Pippel
ATTY.

Patented Mar. 14, 1944

2,344,275

UNITED STATES PATENT OFFICE 2,344,275

BEARING

Joseph C. A. Straub, Fort Wayne, Ind., assignor to International Harvester Company, a corporation of New Jersey Application April 8, 1941, Serial No. 387,460

3 Claims. (Cl. 308—37)

This invention relates to bearings, and particularly to a bearing construction in which the bearing load is off center with respect to the bearing surface.

The principal object of the invention is to improve the life and operation of bearings of the type above mentioned by preventing excessive contact pressure at certain areas and particularly near one end of the bearing.

Somewhat the same object expressed in a different way is the distribution of an offset bearing load in a substantially uniform manner over an entire bearing surface.

In the drawing:

Figure 1 shows a portion of an engine crank-shaft with a connecting rod and piston in operative position;

Figure 2 is an enlarged view, partially in section, showing the connection of the large end of a connecting rod with its bearing on a crank-shaft;

Figure 3 is a section taken on the line 3—3 of Figure 2; and,

Figure 4 is a section taken on the line 4—4 of Figure 2.

In the drawing, a piston 10 is shown mounted for reciprocation in a cylinder 11, said cylinder being represented diagrammatically. A connecting rod 12 connected to the piston is formed with an upper bearing half 13 which is fitted on the bearing surface 14 of a crank 15. Said crank is a portion of a crank-shaft 16, a portion of which is shown in Figure 1. A main bearing surface 17 formed on the crank-shaft is rotatably mounted in a bearing 18 which is conventional in engine construction. The main bearing portion of the crank-shaft is joined to the connecting rod crank by a cheek 19, which is as thin as possible consistent with the necessary strength. At the other side, the crank 15 is connected to a counterweight construction 20.

It will be noted that the connecting rod 12 is offset at one end where the lengthwise portion joins the bearing half 13. A lower bearing half 21 is secured by bolts 22 to the upper bearing half 13, thereby completing the bearing. Bearing liners 22' are fitted into the bearing halves, only the upper half being shown. These liners are preferably of the steel back type, being removable and having a thin layer of bearing material integrally united therewith.

The offset construction of the connecting rod makes an engine construction possible wherein the cylinders are mounted closer together and the length of the crankshaft is correspondingly reduced. It has been found, however, that, when the connecting rod is offset, as illustrated in the drawing, excessive pressure and resulting wear develops at the offset end of the upper bearing half 13. Such excessive pressure prevents the normal flow of lubricant between the bearing surfaces and results in excessive wear at the offset end of the bearing. To overcome this condition, applicant devised the construction illustrated on an exaggerated scale in Figures 2, 3, and 4. In order to illustrate the increased diameter of the upper bearing half at the offset end, a space 23 has been shown at the offset end, while at the other end the bearing surfaces are shown in contact. In the formation of this bearing half, it may be accomplished in many ways. For example, when the bearing is formed by broaching, a shim may be placed under one end of the bearing liner whereby the liner will be thinner at that end when finished, by the thickness of the shim. The variable thickness from end to end of the liner may be provided by any other suitable means. The actual difference is of very small magnitude, being in the neighborhood of one one-thousandth of an inch. It has been found that this slight variation gives greatly increased wear of the bearing liner and reduces excessive wear at the offset end of the bearing.

It will be understood that applicant has shown only a preferred embodiment of his invention and that the illustration has been shown diagrammatically on an exaggerated scale in order to show the principle of the invention.

What is claimed is:

1. In a bearing structure, a journal member having an external generally cylindrical bearing surface, a bearing member having an internal generally cylindrical bearing surface journaled on said external bearing surface, one of said bearing surfaces being slightly conical substantially from end to end to provide a slight difference in the diameter of said surfaces at their ends disposed toward one end of said journal member, and an elongated load-applying member extending radially from said bearing member and having an end thereof in force-transmitting relation with a portion of said bearing member offset toward one end thereof, and said elongated member being bowable under the stress of a compressive force therein applied to the bearing member, to facilitate axial tilting of said bearing member for effecting engagement of axial surface elements of the conical bearing surface throughout their length with the axial surface elements opposed thereto in the other bearing surface.

2. In a connecting rod bearing structure, a sleeve-like bearing member having an inner generally cylindrical bearing surface, a crank-throw bearing member having an outer generally cylindrical bearing surface journaled in the inner bearing surface, one of said surfaces being slightly conical from one of its ends to the other to provide a clearance gradient between said surfaces increasing in radial extent as an end of said bearing members is approached, and a connecting rod disposed in force-transmitting relation with said sleeve-like bearing member at an axial position thereon nearer to the end at which said bearing surfaces clearance is greatest.

3. A connecting rod for use upon a cylindrical crank-throw bearing, comprising an elongated bearing member having an inner substantially cylindrical though slightly conical bearing surface reaching substantially from one end of said member to the other and having a diameter at the smaller diameter end virtually equal to the diameter of said cylindrical bearing for receiving the same, and a rod member extending radially from said bearing member and having an end disposed in radial force-transmitting relation with said bearing member at an axial position thereon nearer to the end thereof at which the conical bearing surface is of greatest diameter, said rod member possessing resiliency and being sufficiently slender to be bowable under the influence of a reactive force moment of which the force is applied radially outwardly from said cylindrical bearing onto that part of the bearing member within the conical bearing surface of less diameter pursuant to a normal load force applied to the bearing member compressively through the rod member, and the pitch of the conical bearing surface being such that the axial element in said surface in radial alinement with the rod member is axially tiltable into parallelism with the axial surface element of the cylindrical bearing.

JOSEPH C. A. STRAUB.

CERTIFICATE OF CORRECTION.

Patent No. 2,344,275.  March 14, 1944.

JOSEPH C. A. STRAUB.

It is hereby certified that error appears in the printed specification of the above numbered patent requiring correction as follows: Page 1, second column, line 49, claim 1, before "one" insert --said--; and that the said Letters Patent should be read with this correction therein that the same may conform to the record of the case in the Patent Office.

Signed and sealed this 6th day of June, A. D. 1944.

Leslie Frazer (Seal)   Acting Commissioner of Patents.